US011039184B2

(12) United States Patent
Nilsson et al.

(10) Patent No.: US 11,039,184 B2
(45) Date of Patent: Jun. 15, 2021

(54) MANAGING CONGESTION RESPONSE DURING CONTENT DELIVERY (71) Applicant: British Telecommunications Public Limited Company, London (GB)

(72) Inventors: Michael Nilsson, London (GB); Stephen Appleby, London (GB); Yousif Humeida, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/472,394

(22) PCT Filed: Dec. 13, 2017

(86) PCT No.: PCT/EP2017/082589
§ 371 (c)(1),
(2) Date: Jun. 21, 2019

(87) PCT Pub. No.: WO2018/114519
PCT Pub. Date: Jun. 28, 2018

(65) Prior Publication Data
US 2019/0364311 A1    Nov. 28, 2019

(30) Foreign Application Priority Data

Dec. 21, 2016   (EP) .................................... 16205772

(51) Int. Cl.
*H04N 21/238*    (2011.01)
*H04L 12/26*    (2006.01)
(Continued)

(52) U.S. Cl.
CPC ... *H04N 21/23805* (2013.01); *H04L 43/0829* (2013.01); *H04L 47/12* (2013.01);
(Continued)

(58) Field of Classification Search
CPC ......... H04N 21/23805; H04N 21/2402; H04N 21/64322; H04N 21/6582; H04N 21/6583;
(Continued)

(56) References Cited

U.S. PATENT DOCUMENTS 6,925,502 B1    8/2005  Abbasi et al.
9,042,244 B2 *  5/2015  Senga ..................... H04L 69/16
                                                    370/252
(Continued)

FOREIGN PATENT DOCUMENTS

EP    1578070 A1    9/2005
EP    2053799 A1    4/2009
(Continued)

OTHER PUBLICATIONS

Extended European Search Report for Application No. 16205772.3, dated Jun. 30, 2017 (7 pgs).
(Continued)

*Primary Examiner* — Jerry B Dennison
(74) *Attorney, Agent, or Firm* — Patterson Thuente Pedersen, P.A.

(57) ABSTRACT

A method of delivering media content over a network, the media content including a plurality of temporal segments, wherein each temporal segment comprises a plurality of data packets, the method including: selecting an initial size of a first congestion window; delivering the plurality of data packets of a first segment using the first congestion window, the initial size of the first congestion window being used to control the size of the first congestion window for the duration of the first segment delivery; measuring the packet loss during the delivery of the first segment; determining an initial size of a second congestion window in dependence on the measured packet loss for the first segment; and deliver-
(Continued)

ing a second segment using the second congestion window, the initial size of the second congestion window being used to control the size of the second congestion window for the duration of the second segment delivery.

14 Claims, 5 Drawing Sheets

(51) Int. Cl.
| | |
|---|---|
| *H04L 12/801* | (2013.01) |
| *H04N 21/24* | (2011.01) |
| *H04N 21/643* | (2011.01) |
| *H04N 21/658* | (2011.01) |
| *H04N 21/6583* | (2011.01) |
| *H04N 21/845* | (2011.01) |

(52) U.S. Cl.
CPC ......... *H04L 47/37* (2013.01); *H04N 21/2402* (2013.01); *H04N 21/64322* (2013.01); *H04N 21/6582* (2013.01); *H04N 21/6583* (2013.01); *H04N 21/8456* (2013.01)

(58) Field of Classification Search
CPC . H04N 21/8456; H04L 43/0829; H04L 47/12; H04L 47/37
See application file for complete search history.

(56) References Cited

U.S. PATENT DOCUMENTS

| | | | | |
|---|---|---|---|---|
| 9,485,184 | B2* | 11/2016 | Mehrotra | H04L 47/25 |
| 10,257,097 | B1* | 4/2019 | Kandasamy | H04L 43/0852 |
| 10,263,894 | B2* | 4/2019 | Lopez Serrano | H04L 47/11 |
| 10,320,526 | B1* | 6/2019 | Ho | H04L 1/0009 |
| 10,375,192 | B1* | 8/2019 | Lepeska | H04L 69/14 |
| 2002/0010938 | A1 | 1/2002 | Zhang et al. | |
| 2003/0103452 | A1* | 6/2003 | Le | H04L 1/187 |
| | | | | 370/229 |
| 2003/0179719 | A1 | 9/2003 | Kobayashi et al. | |
| 2004/0044761 | A1 | 3/2004 | Phillipi et al. | |
| 2004/0215746 | A1* | 10/2004 | McCanne | H04L 67/42 |
| | | | | 709/219 |
| 2005/0259577 | A1 | 11/2005 | Sin | |
| 2007/0076726 | A1* | 4/2007 | Weston | H04L 47/283 |
| | | | | 370/401 |
| 2010/0182905 | A1* | 7/2010 | Matsushita | H04L 47/10 |
| | | | | 370/232 |
| 2011/0261691 | A1 | 10/2011 | Jin et al. | |
| 2013/0163667 | A1 | 6/2013 | Nilsson et al. | |
| 2013/0297743 | A1 | 11/2013 | Eschet et al. | |
| 2014/0032781 | A1 | 1/2014 | Casey et al. | |
| 2014/0169164 | A1* | 6/2014 | Oguchi | H04L 47/193 |
| | | | | 370/230 |
| 2014/0282792 | A1* | 9/2014 | Bao | H04N 21/8456 |
| | | | | 725/116 |
| 2014/0286258 | A1* | 9/2014 | Chowdhury | H04L 1/1854 |
| | | | | 370/329 |
| 2014/0297813 | A1 | 10/2014 | Gomes et al. | |
| 2015/0085665 | A1* | 3/2015 | Kompella | H04L 47/20 |
| | | | | 370/236 |
| 2015/0236966 | A1* | 8/2015 | Francini | H04L 43/0864 |
| | | | | 370/235 |
| 2015/0271073 | A1* | 9/2015 | Saladi | H04L 47/283 |
| | | | | 370/230 |
| 2016/0072637 | A1 | 3/2016 | Gholmieh et al. | |
| 2016/0072723 | A1* | 3/2016 | Shanmuganathan | |
| | | | | H04L 69/163 |
| | | | | 709/226 |
| 2016/0080241 | A1 | 3/2016 | Rocha De Maria et al. | |
| 2016/0105469 | A1* | 4/2016 | Galloway | H04L 63/1441 |
| | | | | 709/231 |
| 2017/0126574 | A1* | 5/2017 | Goel | H04L 41/0896 |
| 2017/0149666 | A1* | 5/2017 | Kiykioglu | H04L 47/27 |
| 2017/0214625 | A1* | 7/2017 | Dhanabalan | H04L 47/2433 |
| 2017/0331753 | A1* | 11/2017 | Li | H04L 47/27 |
| 2019/0364311 | A1* | 11/2019 | Nilsson | H04N 21/6583 |
| 2020/0412783 | A1* | 12/2020 | Nilsson | H04L 65/601 |

FOREIGN PATENT DOCUMENTS

| | | |
|---|---|---|
| EP | 1463228 B1 | 12/2012 |
| EP | 2928145 A1 | 10/2015 |
| GB | 2516112 A | 1/2015 |
| JP | 2008278207 A | 11/2008 |
| WO | WO2018114520 A1 | 6/2018 |
| WO | WO2018121990 A1 | 7/2018 |

OTHER PUBLICATIONS

GB Search Report for Application No. 1621854.7, dated Jun. 7, 2017 (1 pg).
International Search Report for Application No. PCT/EP2017/082589, dated Apr. 13, 2018 (5 pgs).
UC Berkeley student project, 2005, "A comparative analysis of TCP Tahoe, Reno, New-Reno, SACK and Vegas," Obtained from: [http://inst.eecs.berkeley.edu/~ee122/fa05/projects/Project2/SACKRENEVEGAS] (7 pgs).
U.S. Appl. No. 16/473,784, filed Jun. 26, 2019, Inventor(s): Nilsson et al.
Application and Filing Receipt for U.S. Appl. No. 16/472,427, filed Jun. 21, 2019, Inventor(s): Nilsson et al.
International Search Report and Written Opinion for Application No. PCT/FP2017/082671, filed Dec. 13, 2017, dated Feb. 23, 2018 (10 pgs).
European Search Report for Application No. EP 16 20 5777, dated Apr. 18, 2017 (9 pgs).
Great Britain Search Report for Application No. GB 1621855.4, dated Apr. 27, 2017 (5 pgs).
International Search Report for Application No. PCT/EP2017/082590, dated Feb. 21, 2018 (3 pgs).

* cited by examiner

MANAGING CONGESTION RESPONSE DURING CONTENT DELIVERY

CROSS-REFERENCE TO RELATED APPLICATION

The present application is a National Phase entry of PCT Application No. PCT/EP2017/082589, filed Dec. 13, 2017, which claims priority from European Patent Application No. 16205772.3 filed Dec. 21, 2016, each of which is fully incorporated herein by reference.

TECHNICAL FIELD

This disclosure relates to a method and apparatus for managing the congestion response to packet loss during the delivery of a content data sequence over a network.

BACKGROUND

There is an increasing demand for delivering media content (e.g. audio and/or video content) over networks.

One approach for delivering a stream of media content over a network is to segment the media content stream into a plurality of temporal segments. Each segment can then be communicated over the network in the form of a series of data packets. One class of techniques in which a stream of content is segmented into temporal segments is adaptive bitrate delivery.

In adaptive bitrate delivery, a media content stream is separately encoded at multiple bitrates to produce multiple encoded streams. If the media content comprises audio and video content (so that the media stream comprises an audio stream and a video stream), each of the audio and video streams may be encoded separately and at multiple bitrates to produce a plurality of encoded video streams and a plurality of encoded audio streams. Each encoded media stream is segmented into a plurality of temporal segments. Each temporal segment may contain between 2 and 15 seconds' worth of decoded media content, for example. The segmentation of the media content may occur before or after the media stream(s) are encoded.

The segments of media content are then communicated over the network to a receiver device as a series of data packets.

The bitrate of each segment of media content delivered to the receiver can be selected from the set of bitrates at which the content is encoded. Thus, the receiver device may receive segments of media content at different encoded bitrates. This bitrate may be requested by the receiver or selected by the sender.

A problem associated with delivering segmented media content over a network is that the delivery time of a given segment may be highly variable. Though adaptive bitrate delivery can operate to adjust the quality (i.e. encoded bitrate) of a delivered content stream in real-time to take account of available network resources, it still often suffers from unpredictable and variable delivery times for given segments of content. This variability may arise in part from the nature of the communication protocols used to deliver the media content.

For example, the delivery of media content over a distributed computer network like the internet typically implements the use of TCP as the transport protocol.

TCP was designed to achieve reliable transmission of data over a network with an aim of avoiding adversely affecting the network throughput of competing TCP traffic flows. In accordance with the TCP protocol, packets that are lost in transmission are retransmitted in an attempt to achieve reliable delivery. In addition, the TCP protocol implements a congestion response, or congestion avoidance, scheme. As part of this scheme, the transmission rate of packets from a sender to a receiver over the network is typically reduced following a detected packet loss on the assumption that the packet loss was caused by congestion on the network.

The transmission rate of packets into the network may be controlled by a parameter known as the congestion window (which may be denoted herein as CWND). The congestion window may indicate the maximum permissible number of packets that at any given time have been communicated into the network but not yet acknowledged by the receiver. A TCP sender (e.g. a media content server) may maintain a congestion window for each receiver (e.g. a content client) connection. Following a detected packet loss over a given connection, the TCP sender typically takes rapid action to significantly decrease the size of the congestion window in order to reduce the transmission rate for that connection. This in turn causes the transmission rate of packets during delivery of a given segment of content to be variable and highly contingent on the packet loss rate suffered during delivery of that segment.

If the delivery time of a segment of content is variable and unpredictable, then the performance of the media playout at the receiver may be adversely affected by buffering delays and playout stalling. One approach to minimize the risk of these performance defects is to include within the receiver large amounts of buffering. However, this approach may in turn incur a performance penalty of high end-to-end latency due to the time required to adequately fill the buffer.

SUMMARY

According to one aspect of the present disclosure there is provided a method of delivering media content over a network, the media content comprising a plurality of temporal segments, wherein each temporal segment comprises a plurality of data packets, the method comprising: selecting an initial size of a first congestion window; delivering the plurality of data packets of a first segment using the first congestion window, the initial size of the first congestion window being used to control the size of the first congestion window for the duration of the first segment delivery; measuring the packet loss during the delivery of the first segment; determining an initial size of a second congestion window in dependence on the measured packet loss for the first segment; and delivering a second segment using the second congestion window, the initial size of the second congestion window being used to control the size of the second congestion window for the duration of the second segment delivery.

The size of the first congestion window may be equal to its initial size for the duration of the first segment delivery.

The size of the first congestion window may be variable throughout delivery of the first segment dependent on packet loss and controlled so as to be greater than or equal to its initial size for the duration of the delivery of the first segment.

Delivering the first segment using the first congestion window may comprise increasing the size of the first congestion window from its initial size during periods of no packet loss, and resetting the size of the first congestion window to its initial size in response to each packet loss during the delivery of the first segment.

The initial size of the first congestion window may be selected in dependence on the size of the first segment and a specified time interval for delivering the first segment.

The initial size of the first congestion window, $CWND_1$ may be greater than or equal to $$\frac{(RTT \times D)}{\Delta T_1},$$

where RTT is a round trip time, D is the data size of the first segment, and $\Delta T_1$ is the specified time interval for delivering the first segment.

The initial size of the first congestion window may be selected in dependence on a measured packet loss rate for a preceding segment delivered prior to the first segment.

The method may further comprise calculating the packet loss rate during delivery of the first segment from the measured packet loss; and determining the initial size of the second congestion window in dependence on the calculated packet loss rate for the first segment.

The initial size of the second congestion window may be determined in dependence on the calculated packet loss rate for only the first segment.

The initial size of the second congestion window may be determined in dependence on the calculated packet loss rate for the first segment and one or more preceding segments delivered prior to the first segment.

Determining the initial size of the second congestion window may comprise determining a target bitrate for the delivery of the second segment in dependence on the calculated packet loss rate for the first segment, and determining the initial size of the second congestion window from the target bitrate.

The target bit rate may be determined from the calculated packet loss rate for the first segment and the packet loss rates for the one or more preceding segments delivered prior to the first segment.

The target bit rate for the delivery of the second segment may be determined from an average of the packet loss rates for the first segment and the one or more preceding segments delivered prior to the first segment.

The target bitrate for the delivery of the second segment may be greater than or equal to the bitrate required to deliver the second segment within a specified time interval $\Delta T_2$.

According to a second aspect of the present disclosure there is provided a server for delivering media content over a network, the media content comprising a plurality of temporal segments, wherein each temporal segment comprises a plurality of data packets, the server comprising: a congestion window unit configured to select an initial size of a first congestion window; a dispatch unit configured to deliver the plurality of data packets of a first segment using the first congestion window, the dispatch unit being further configured to control the size of the first congestion window using the initial size of said first congestion window for the duration of the first segment delivery; and a packet loss detector configured to measure packet loss during delivery of the first segment; wherein the congestion window unit is further configured to determine an initial size of a second congestion window in dependence on the measured packet loss for the first segment; and the dispatch unit is further configured to deliver a second segment using the second congestion window, and to control the size of the second congestion window using the initial size of the second congestion window for the duration of the second segment delivery.

The size of the first congestion window may be equal to its initial size for the duration of the delivery of the first segment.

The dispatch unit may be configured to vary the size of the first congestion window throughout the delivery of the first segment dependent on packet loss and to maintain the size of the first congestion window to be greater than or equal to its initial size for the duration of the delivery of the first segment.

The dispatch unit may be configured to increase the size of the first congestion window from its initial size during periods of no packet loss, and to reset the size of the first congestion window to its initial size in response to each packet loss during the delivery of the first segment.

The congestion window unit may be configured to select the initial size of the first congestion window in dependence on the size of the first segment and a specified time interval for delivering the first segment.

The initial size of the first congestion window, $CWND_1$ may be greater than or equal to $$\frac{(RTT \times D)}{\Delta T_1},$$

where RTT is a round trip time, D is the data size of the first segment, and $\Delta T_1$ is the specified time interval for delivering the first segment.

The congestion window unit may be configured to select the initial size of the first congestion window in dependence on a measured packet loss rate for a preceding segment delivered prior to the first segment.

The packet loss detector may further be configured to calculate the packet loss rate during delivery of the first segment from the measured packet loss; and the congestion window unit being configured to determine the initial size of the second congestion window in dependence on the calculated packet loss rate for the first segment.

The congestion window unit may be configured to determine the initial size of the second congestion window in dependence on the calculated packet loss rate for only the first segment.

The congestion window unit may be configured to determine the initial size of the second congestion window in dependence on the calculated packet loss rate for the first segment and one or more preceding segments delivered prior to the first segment.

The server may further comprise a bit-rate calculator configured to determine a target bit-rate for the delivery of the second segment in dependence on the calculated packet loss rate for the first segment; and the congestion window being configured to determine the initial size of the second congestion window from the target bit rate.

The bit-rate calculator may be configured to determine the target bit rate from the calculated packet loss rate for the first segment and the packet loss rates for the one or more preceding segments delivered prior to the first segment.

The bit rate calculator may be configured to determine the target bit rate from an average of the packet loss rates for the first segment and the one or more preceding segments delivered prior to the first segment.

The bit rate calculator may be configured to set the target bitrate for the delivery of the second segment to be greater than or equal to the bitrate required to deliver the second segment within a specified time interval $\Delta T_2$.

BRIEF DESCRIPTION OF THE DRAWINGS

The present disclosure will now be described by way of example with reference to the accompanying drawings. In the drawings.

DETAILED DESCRIPTION

The examples of the present disclosure are directed to a method of delivering media content over a network. The media content could be video content (e.g. in the form of a video sequence), audio content (e.g. in the form of an audio sequence) or it may include audio and video content (i.e. the media content could be multimedia content). The media content comprises a plurality of temporal segments. Each segment may contain data for a small temporal duration at playout (e.g. 2 to 15 seconds' worth of data). The number of data packets per segment of media content is dependent on the duration of the temporal segment, the encoded bit rate and the size of each data packet, and may range from several tens of data packets to thousands of data packets. For example, with temporal segments of duration 10 s, an encoded bit rate of 1 MBit/s, and a data packet size of 1500 bytes, each media content segment would comprise 833 data packets ($10\times1000000/(1500\times8)$).

A first segment of the media content is delivered (e.g. from a sender device to a receiver device) using an associated first congestion window. The first congestion window may be denoted herein as $CWND_1$, for brevity. Before delivering the first segment of content, an initial size of the first congestion window is selected. This initial size is used to control the size of the first congestion window for the duration of the first segment delivery. That is, the initial size of the first congestion window is used to control the first congestion window size throughout the delivery of the first segment. For example, the size of the first congestion window may be constant and equal to the initial size for the duration of the delivery of the first segment (i.e. independently of any packet loss). Alternatively, the size of the first congestion window may increase from its initial value during periods of no detected packet loss and may be reset to its initial size in response to each detected packet loss during the delivery of the first segment.

The packet loss sustained during the delivery of the first segment is measured. This measured packet loss is used to determine an initial size of a second congestion window for delivering a second content segment. The second content segment is then delivered over the network using the associated second congestion window, where similarly to the first segment the initial size of the second congestion window is used to determine the subsequent size of the second congestion window for the duration of the second segment delivery.

The first and second segments could be temporally consecutive segments, though they need not be. For example, the first and second segments could be non-consecutive segments of the content data sequence separated by one or more temporally intermediate segments. In addition, the use of 'first' and 'second' to refer to the content segments is not being used to imply a temporal order of the segments within the sequence: the first segment could be before or after the second segment within the sequence.

By using the initial size of the congestion window to control the subsequent size of the window throughout the delivery of a content segment, the embodiments described herein aim to decouple the full extent of the congestion response to packet loss from the packet loss event itself within the delivery of a given content segment. Because the amount of packet loss sustained during the delivery of a segment is often unpredictable and variable, decoupling the congestion response from the packet loss events during the delivery of a given content segment enables the delivery time of that segment to be more predictable and less variable. Furthermore, because the measured packet loss sustained during the delivery of the first segment is used to determine the size of the congestion window (and thus transmission rate) for the delivery of the second segment, a congestion response commensurate with the amount of packet loss sustained can be implemented over a longer time frame than one segment. This means that, over the longer term, the media content can be delivered over the network with more predictable segment delivery times whilst dominating the available bandwidth of the network to the detriment of competing traffic, thus making the example embodiments described herein suitable for use with TCP.

Example embodiments of the present disclosure will now be described. For the purposes of clarity, in the following examples media content is delivered over a network in accordance with an HTTP and underlying TCP protocol using adaptive bit rate delivery. The HTTP protocol could for example be an HTTP Adaptive Streaming protocol, such as the HTTP Live Streaming (HLS) protocol, MPEG-DASH, SmoothStreaming, Adobe HTTP Dynamic Streaming etc. The TCP protocol could be any suitable protocol, such as TCP Reno, TCP New Reno, TCP Cubic, TCP Tahoe, TCP Vegas, etc.

Figure 1:
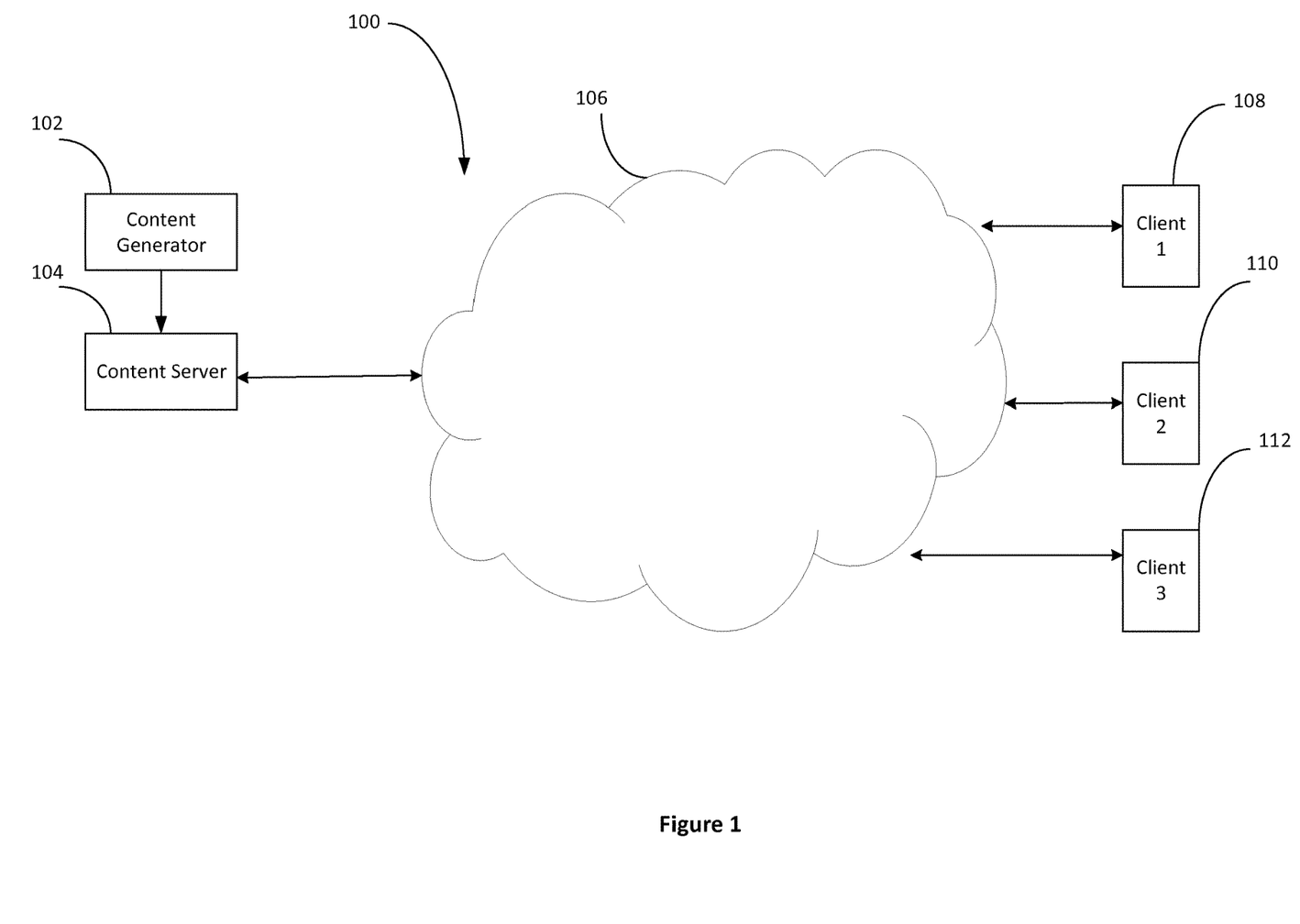
FIG. 1 shows an example of a communication network.

FIG. 1 shows an example of a communication system 100. The system comprises a content sender (in the form of a server) 104 and a plurality of receivers (in the form of content clients) 108, 110 and 112 separated by a communication network 106. The network 106 could be a wireless network, a wired network, or a combination of a wired and wireless network. The network 106 could be (or could form part of) a distributed computing network, such as the internet.

The content server 104 is shown communicatively coupled to a content generator 102. The content generator 102 may be configured to encode media content and to communicate the media content to the content server 104. As described above, the media content could comprise video and/or audio streams. The content generator 102 may be configured to encode the video stream separately at multiple different bit rates to generate multiple encoded video streams each encoded at a different bit rate. The video content could for example be encoded according to the ITU-T H.264 standard, though of course other standards may also be used. If the media content additionally comprises audio content, then this may be encoded at only a single bit rate (to generate a single encoded audio stream) or at multiple bit rates to generate respective encoded audio streams. One example of the standard for encoding the audio stream is MPEG-4 HE AAC, but of course other standards may alternatively be used. The content generator 102 may also be configured to segment the media content into a plurality of discrete temporal segments. If the media content was encoded at multiple bitrates, each encoded stream may be segmented. The, or each, content stream could be segmented before or after encoding. That is, a content stream may be segmented, with each resulting segment then encoded at different bit rates; or each encoded content stream could be segmented to generate a plurality of encoded segments.

The content server 104 is configured to receive media content from content generator 102 and may store the received content. As indicated above, the media content received by the content generator 102 may be encoded and segmented. The content server may communicate, or deliver, the media content to one or more of the clients 108, 110 and 112 via the network 106. The content server 104 could be a video streaming server, and may deliver video (and/or audio) content on request to the clients. Thus, the client devices 108, 110 and 112 may be adapted to request media content from the server 104. The client devices could for example be a suitably configured set-top box, PC, laptop, smartphone, tablet, smart TV, etc.

Figure 2:
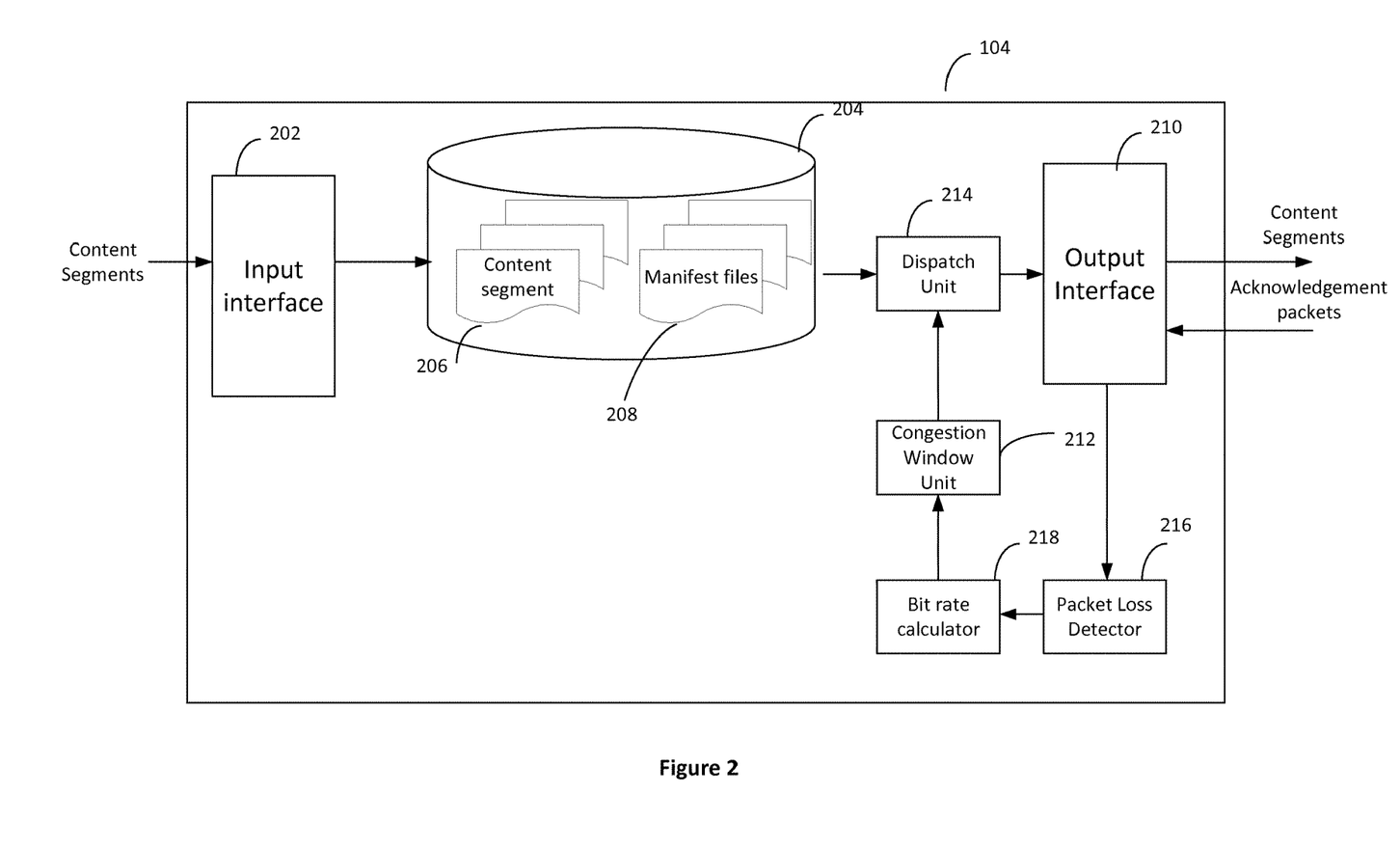
FIG. 2 shows an example of a server forming part of the network in FIG. 1.

An example of the server 104 is shown in more detail in FIG. 2. The server comprises an input interface 202; a data store 204 and an output interface 210. The server further comprises a congestion window unit 212, a dispatch unit 214 coupled to the output interface, a packet loss detector 216 and a bit rate calculator 218. The packet loss detector may be coupled to the output interface 210, as shown in this example. The content server 104 may be configured to receive the encoded content segments from the content generator at the input interface 202 and to store the received encoded segments 206 in the data store 204. Each content segment may be associated with a manifest file 208 that may contain information on the bit rates at which the associated content segment was encoded, and an indication of where the associated content segment is stored within the store 204 of the server. Each manifest file may also optionally store an indication of the duration of the media content encoded in the associated content segment. The manifest files may also be stored in the store 204. Each content segment is transmitted from the server via the output interface 210 as a series of data packets. That is, each segment of content data is formed of a plurality of data packets. The content server 104 may also receive via the output interface 210 acknowledgement packets from one or more content clients to which the server has transmitted data packets. The communication system may be arranged so that the content server receives an acknowledgement packet for each data packet successfully delivered to a client over the network. The operation of the congestion window unit 212, dispatch unit 214, packet loss detector 216 and bit rate calculator 218 will be described below with reference to FIG. 4.

Figure 3:
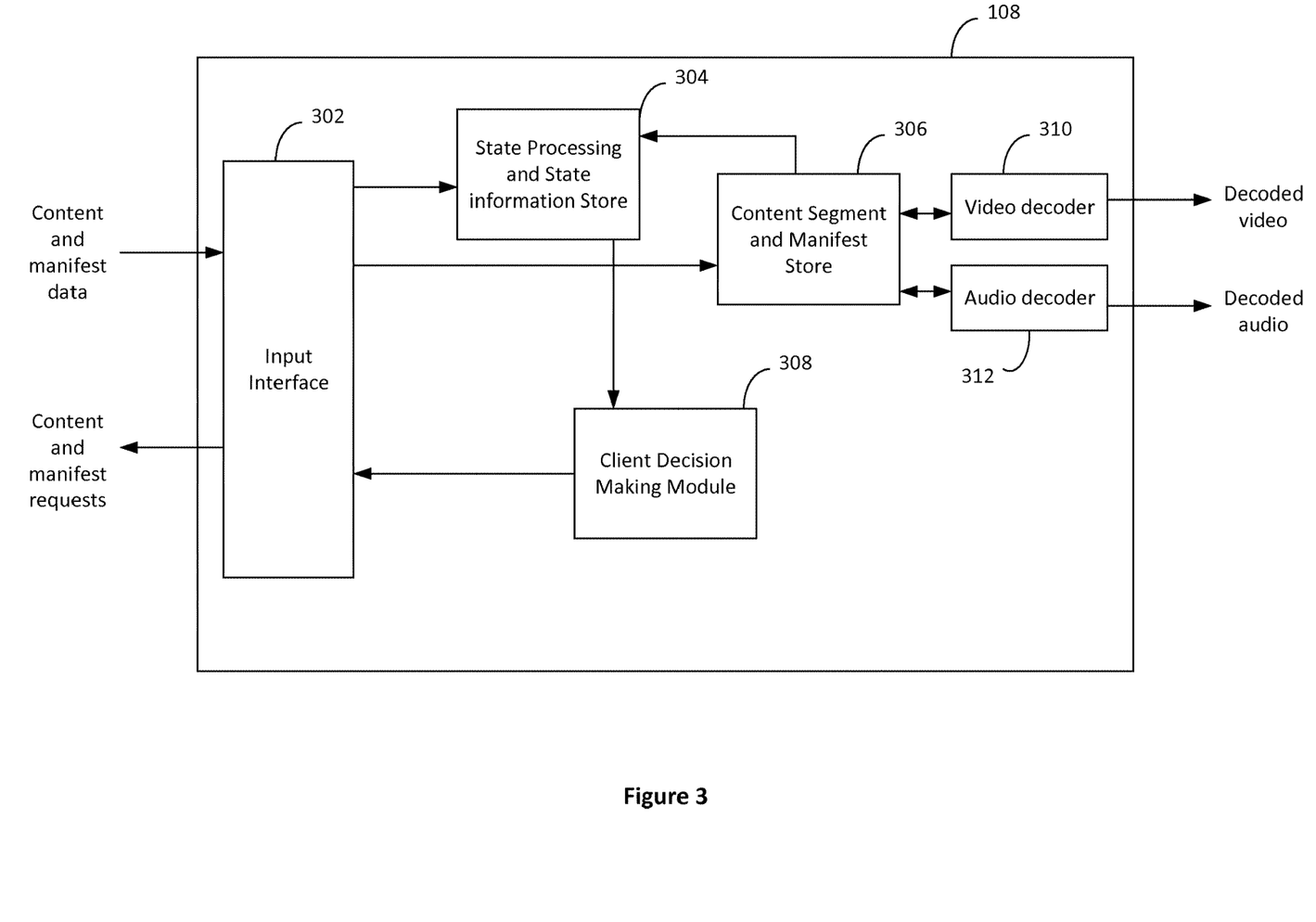
FIG. 3 shows an example of a client forming part of the network in FIG. 1.

An example of a content client (in this case, client 108) is shown in more detail in FIG. 3. In this example, the client 108 comprises an input interface 302; a state processing and state information store 304; a client decision making module 308; a content segment and manifest store 306 and a media content decoder, in this example in the form of a video decoder 310 and an audio decoder 312.

The client 108 initiates a request for content delivery by communicating a request to the server 104 for a manifest file associated with the desired content segment via the interface 302. In response to receiving the requested manifest file from the server 104, the client 108 stores the file in the content segment and manifest store 306. The decision-making module 308 analyses the manifest file and in response issues a request for a content segment at a specified encoded bit rate from the server 104. The request is communicated to the server 104 from the client 108 via the interface 302. In response to receiving the request, the server 104 delivers the requested content segment over the network 106 to the client 108. The client 108 receives the content segment (in the form of a series of data packets) through its interface 302 and passes it to the content segment and data store 306. The received content segments are passed to the media decoders 310 and 312. The decoders 310 and 312 perform decoding operations on the content segment and output the decoded media content (i.e. decoded audio and/or video content) for presentation to a user. Once a content segment has been decoded, it may be removed from the segment store 306. The client 108 may additionally transmit an acknowledgment packet over the network 106 back to the server for each data packet received. The acknowledgement packets may be transmitted via the client's interface 302.

The state processing and information store 304 may monitor one or more state parameters indicative of the state of the delivery of the media content from the server 104. These parameters may include one or more of: the rate at which content data is received at the interface 302; the rate at which content is decoded and presented to a user via the media decoders; and the amount of (not yet decoded) content segment data stored in the segment and manifest store 306.

The client decision making module 308 may determine the next requested content segment and the encoded bit rate of that segment in dependence on an analysis of the associated manifest file for that segment and the state parameters determined by the state processing store 304.

The media content requests issued by the client 108 to the server 104 may be HTTP requests (e.g. HTTP GET requests). A request may be issued for each segment of media data.

Though only client 108 has been described above in more detail, it will be appreciated that clients 110 and 112 may have the same components as client 108 and operate in an analogous way.

The operation of the sever 104 when delivering segments of media data over the communication network 106 in accordance with the present invention will now be described with reference to the flow chart of FIG. 4. In this example, the server is delivering media content over the network to client 108.

The following will be described with reference to a segment of content referred to as a 'first segment'. This first segment need not be the first segment in a streaming session between the server and client, and may refer to any segment being communicated as part of a streaming session. The first segment may be any segment scheduled for delivery to the client at a time when the implemented TCP protocol has completed its slow start process or some other similar process initiated at the start of a streaming session from the server to the client. The segment may have been requested for delivery by one of the clients (e.g. client 108) in the manner described above as part of a streaming session between the server and client.

At 400, the segment index n is set to '1' to refer to the first segment for delivery to the client over the network 106.

At 402, the congestion window unit 212 selects an initial size of a first congestion window. The first congestion window will be used for delivering the first segment over the network 106. The congestion window for segment n may be denoted generally as CWND(n). For clarity, first congestion window as referred to in this example will be denoted $CWND_1$. As used herein, the size of a congestion window may be specified in terms of a number of packets, or in terms of bytes.

The initial size of the first congestion window may be equal to the size of the congestion window immediately following the completion of an initial slow start process. That is, the initial size of the congestion window may be equal to the size of the congestion window at the beginning of a congestion avoidance phase of the TCP protocol.

Alternatively, the initial size of the first congestion window may be selected by the congestion window unit 212 in dependence on the size of the first segment and a specified time interval for delivering the first segment. The 'size' of the first segment may refer to the amount of data (e.g. in bits, bytes, etc.) in the first segment. The time interval for delivering the content segment to the client 108 over the network 106 may be specified by the client. For example, the client may append to the server request for a content segment an indication of the time by which delivery of that segment is desired. Alternatively, the time interval for delivery may be specified by the server 104. The server may specify the time interval for delivery based on a consideration of delivering the media content as a whole to the client 108 in a timely fashion with minimal latency. This type of content delivery, in which the server specifies the time interval for delivery of a content segment, may be referred to as HTTP push, with the server 104 being said to implement an HTTP push mechanism.

To see how the initial size of the first congestion window can be selected based on a specified time period for delivery of the first segment, consider the following model in which the data packet delivery rate $R_{TCP}$ that could be achieved through network 106 using a TCP protocol is approximated as:

$$R_{TCP} = \frac{CWND}{RTT} \quad (1)$$

where CWND is the congestion window size (in numbers of packets or in bytes) and RTT is the round-trip time (i.e. the time interval between the time of transmission from the server of a packet into the network and the time of receipt at the server of an acknowledgement of that packet from the client). Thus $R_{TCP}$ may have units of packets per second, or bytes per second depending on the units used to define the size of the congestion window.

If D represents the size of a segment (again, in terms of bytes or the number of packets forming the segment), and the time interval for delivering the segment is $\Delta T_1$, then the minimum data packet delivery rate $R_{req}$ for timely delivery of that segment is given by:

$$R_{req} \geq \frac{D}{\Delta T_1} \quad (2)$$

By equating the data packet delivery rates in equations (1) and (2) and rearranging in terms of the congestion window size, we can derive the following requirement for the size of the congestion window to ensure timely delivery of the first content segment as:

$$CWND_1 \geq RTT \times \frac{D}{\Delta T_1} \quad (3)$$

The initial size of the first congestion window may therefore be selected in accordance with equation (3) if there is a specified time interval (by the server or client) for delivering the first content segment.

Once an initial size of the first congestion window has been selected, then at step 404 the server 104 delivers the first segment to the client 108 over the network 106 using the first congestion window. The delivery of the content segment is controlled by the dispatch unit 214, which may cause data packets of the content segment to be transmitted over the network via the server's output interface 210. The dispatch unit 214 is further configured to use the initial size of the first congestion window determined at 402 to control the size of the first congestion window for the duration of the first segment delivery (i.e. until the delivery of the first segment has completed).

In other words, in embodiments in accordance with the present disclosure, at each point during the delivery of the first content segment, the size of the first congestion window is controlled in dependence on the value of its initial size selected at 402. This is the case even if packet loss occurs during the delivery of the first segment, which may comprise several hundred or thousand data packets. The dispatch unit 214 may control the size of the first congestion window so that, following, or in response to, a packet loss during delivery of the first segment, the size of the first congestion window is dependent on only the initial size of the first congestion window. This contrasts with content delivery using conventional TCP implementations in which, following a packet loss, it is typical for the size of the congestion window (or the threshold size of the congestion window) to be approximately halved from its value immediately preceding the packet loss in accordance with a congestion avoidance mechanism known as additive increase multiplicative decrease.

By instead using the initial size of the congestion window to control the size of the congestion window throughout the delivery of the first segment, and not adjusting the congestion window immediately following packet loss experienced to one of the plurality of packets that make up the segment, the congestion response to packet loss required by TCP protocols can be delayed until after the delivery of the first segment has completed. In other words, the rapid response to packet loss that is typical of conventional TCP implementations—and a cause of the unpredictability of delivery times for content segments—can be avoided.

The dispatch unit 212 may operate to control the size of the first congestion window during delivery of the first segment in a number of ways.

In one example, the size of the first congestion window is constant for the duration of the first segment delivery and equal to its initial size. That is, the dispatch unit 212 causes the size of the first congestion window to be kept constant throughout the delivery of the first segment independently of any packet loss that occurs during delivery of the data packets of that segment. If the initial value of the first window size is selected in accordance with equation (3), this approach enables the first content segment to be delivered to the client 108 within the specified time interval irrespective of the amount of packet loss sustained during delivery of the segment.

In other examples, the size of the first congestion window may vary throughout delivery of the first segment in dependence on the packet loss sustained during delivery. For instance, the size of the first congestion window may increase from its initial value during periods of the delivery with no packet loss, and may be reset by the dispatch unit 212 following each detected packet loss. However, rather than resetting the size of the congestion window to be half its value immediately preceding the packet loss (as is conventionally done in typical TCP implementations), the dispatch unit 212 may instead reset the size of the first congestion window to its initial size (as determined at 402) following each detected packet loss during the delivery of the first segment. Thus, following a packet loss during the delivery of the first segment, the size of the first congestion window is controlled only by the initial size of the first congestion window. This avoids large decreases in the size of the congestion window following a packet loss that may be encountered with the additive increase multiplicative decrease algorithm conventionally implemented in some TCP congestion control schemes.

The dispatch unit 212 may increase the size of the congestion window during periods of no packet loss in an additive fashion, for example by increasing the size of the congestion window by m segment sizes every round-trip time (i.e. after every time interval equal to the round trip time that elapses without a packet loss). The value of m could be any suitable integer, for example 1, 2, 3, etc. The size of the congestion window may be increased in other ways. For instance, the size of the congestion window may be increased by m segment sizes each time an acknowledgement message is received at the server 104 from the client 108. This would result in a relatively rapid increase in the size of the congestion window during periods of no detected packet loss.

Figure 5:
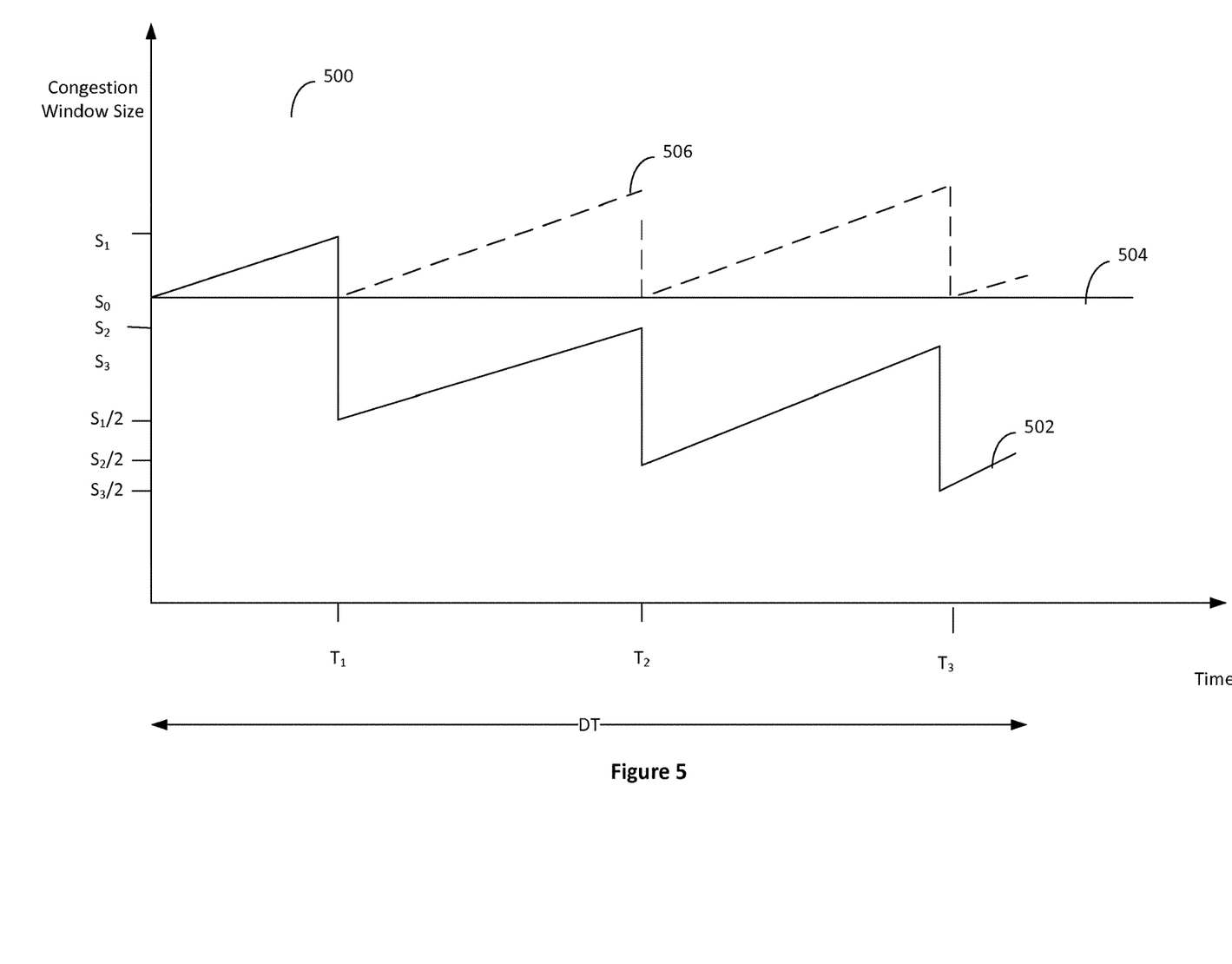
FIG. 5 is a schematic illustration of the size of the congestion window during delivery of a content segment for a conventional TCP implementation and in accordance with the examples of the present disclosure.

An illustration of the size of the congestion window during the delivery of the first segment and how this may compare to conventional TCP implementations is shown in FIG. 5. The x-axis of graph 500 is time, and the y-axis the size of the first congestion window. The time interval $\Delta T$ represents the time to deliver the first segment. Times T1, T2 and T3 denote the time of a respective packet loss during the delivery of the segment. The initial size of the congestion window for the delivery of the segment is denoted $S_0$.

Line 502 denotes the size of the congestion window following a conventional TCP implementation such as TCP New Reno. In the periods between packet losses, the size of the congestion window increases (e.g. in accordance with the congestion avoidance phase). Following each packet loss, the size of the congestion window is halved relative to its size immediately preceding the packet loss. Thus, immediately preceding the packet loss at time T1, the size of the congestion window is $S_1$, and immediately following the packet loss, the size is reduced to $S_1/2$. Following the packet losses at time T2 and T3, the size of the congestion window is reduced from $S_2$ to $S_2/2$ and from $S_3$ to $S_3/2$ respectively.

Line 504 denotes the size of the congestion window in the case that the size is kept constant throughout the delivery of the first segment. Line 506 denotes the size of the congestion window in the case that the size of the congestion window increases during periods of no packet loss, and is reset to its initial size in response to each packet loss. It can be seen that resetting the size of the congestion window to its initial size following each packet loss restricts the amount by which the size of the window is reduced compared to conventional TCP implementations. In addition, it can be seen that controlling the size of the congestion window in accordance with the examples described herein enables the size of the congestion window to be maintained at or above its initial size for the duration of the first segment delivery. Provided the initial size was chosen suitably, this enables the segment to be delivered at or before a predicted time regardless of the packet loss experienced during delivery of the segment.

Following 404, the delivery of the first content segment to the client 108 is completed. The server may determine that the delivery of the first segment has completed when it has received an acknowledgement message from the client 108 for each data packet forming the first content segment.

At 406, the packet loss during the delivery of the first segment is measured. The measurement of the packet loss is performed by the packet loss detector 216, which may be configured to detect each packet loss. The packet loss detector 216 may detect that a packet loss has occurred in response to an observation of certain indicative events. One example of such an indicative event is the receipt of duplicate acknowledgement packets from the client 108 (that is, acknowledgement messages that contain the same sequence number). As shown in FIG. 2, the packet loss detector 216 may be coupled to the interface 210 to enable the detector 216 to inspect each acknowledgement packet received at the server 104. The detector 216 may inspect the sequence number of each received acknowledgement packet and detect that a packet loss has occurred in response to detecting a plurality of acknowledgement messages (e.g. two, three or more) with the same sequence number. Another example of an indicative event of packet loss is the expiration of a packet re-transmission timer (known as a 'timeout'). A packet re-transmission timer may be stored at the server 104 (not shown in FIG. 2) and initiated in response to sending a packet. It may specify a time by which the server is to receive an acknowledgement of the packet from the client before the packet is deemed lost and retransmitted. The timer may be reset in response to the receipt of an acknowledgement packet. The packet loss detector 216 may be coupled to the timer to enable it to detect when the timer expires.

The packet loss detector 216 may be configured to store a record indicating when each packet loss during the delivery of a segment occurred. For example, the record may include, for each detected packet loss, a parameter indicative of when that loss occurred. That parameter could be a temporal value, a packet number or some other parameter. The packet loss detector may be configured to populate the record during the delivery of the first segment as each packet loss is detected.

For clarity, it is noted that 406 may be performed by the packet loss detector 216 throughout the delivery of the first segment. That is, 406 may at least partially overlap in time with 404, such that the server 104 may perform 404 and 406 concurrently.

At 408, the server determines whether all segments of the current streaming session have been delivered to the client. If it is determined that all segments have been delivered, then the streaming session is deemed completed and the process ends. If it is determined that not all the segments have been delivered, then at 410 the segment index n is incremented by one, so that n is set to the value of n+1. Continuing the present example, at step 410 the segment index is incremented to '2'.

At 412, the congestion window unit 212 determines an initial size of a second congestion window in dependence on the measured packet loss for the first segment. The second congestion window will be used for the delivery of the segment with the segment index n=2 (which will be referred to as the second segment), and may be denoted $CWND_2$ for clarity.

By using the measured packet loss during the delivery of the first segment to determine the initial congestion window size for the second segment, a suitable congestion response to the sustained packet loss can be implemented over a longer time scale (i.e. a time frame longer than one segment). This enables the connection between the server 104 and client 108 to be fair to competing TCP traffic by implementing a congestion response commensurate with the measured packet loss. However, by implementing the congestion response over a longer time frame compared to conventional TCP implementations, highly variable and unpredictable segment delivery times may be avoided.

The congestion window unit 212 may determine the initial size of the second congestion window using the measured packet loss for only the first segment (that is, not taking the measured packet loss for any other previously delivered segments into account). Alternatively, the congestion window unit 212 may determine the initial size of the second congestion window in dependence on the measured packet loss for the first segment and also in dependence on the measured packet loss for one or more preceding segments delivered prior to the first segment (it will be recalled that the term 'first segment' is being used to identify a segment for the purposes of the present example and not to imply the segment is the first segment to be delivered as part of the streaming session between the server and client).

The congestion window unit 212 may determine the initial size of the second congestion window using the measured packet losses for a plurality of previously delivered segments by taking an average of the measured packet losses for those segments and using the calculated average packet loss to determine the initial size of the second congestion window. The average could be an unweighted average, or a weighted average. The weighted average may accord higher weights to the measured packet losses associated with the more recently received segments.

One way in which the measured packet loss may be used to select an initial size of the second congestion window is by calculating a packet loss rate and using that packet loss rate to determine the initial size of the second congestion window. For example, the packet loss detector 216 may use the measured packet loss for the first segment to calculate a packet loss rate, and the congestion window unit 212 may determine the initial size of the second congestion window in dependence on the calculated packet loss rate. The congestion window unit 212 may determine the initial size of the second congestion window in dependence on the packet loss rate for only the first segment, or in dependence on the packet loss rates for the first segment and one or more preceding segments. If multiple packet loss rates are used, the packet loss detector 216 may calculate an average packet loss rate for the plurality of previously received segments (i.e. the average packet loss rate for the first segment and one or more preceding segments). The average packet loss rate may be calculated from the average measured packet loss. As described above for the measured packet loss, the average packet loss rate may be a weighted or unweighted average. The congestion window unit 212 may then calculate the initial size of the second congestion window in dependence on this average packet loss rate.

One way in which a packet loss rate may be used to determine the initial size of the second congestion window is to use the packet loss rate to calculate a target bit rate for the delivery of the second segment and then to calculate the initial size of the second congestion window from the target bit rate. The packet loss rate used to calculate the target bit rate may be the packet loss rate for only the first segment or the average packet loss rate for the first segment and one or more preceding segments. The target bit rate may be calculated by the bit rate calculator 218. The bit rate calculator 218 receives a packet loss rate calculated by the packet loss detector 216 and calculates from that value a target bit rate. The bit rate calculator is configured to communicate the calculated target bit rate to the congestion window unit 212, which may use the target bit rate to calculate the initial size of the second congestion window.

The bit rate calculator 218 may calculate the target bit rate for the delivery of the second segment as the bit rate that a typical TCP implementation might have achieved delivering a segment under a similar packet loss rate to that calculated by the packet loss detector 216. For example, the bit rate calculator might calculate the target bit rate, $R_T$ according to the following equation:

$$R_T = \frac{\sqrt{3}\, s}{RTT\sqrt{2p}} \quad (4)$$

where s is the size of the segments, RTT is the round-trip time, and p is the packet loss rate (again, either the packet loss rate for the delivery of the first segment only, or an average packet loss rate for the delivery of the first segment and one or more preceding segments delivered prior to the first segment). Equation (4) estimates the bit rate that can be achieved for a typical TCP implementation for given packet loss conditions as specified by the packet loss rate p.

Rather than use the bit rate calculated from equation (4) as the target bit rate, the bit rate calculator 218 may calculate the target bit rate $R_T$ in dependence on the bit rate calculated in accordance with equation (4) and one or more other factors, such as the bit rate at which the second segment has been encoded, and the bit rate at which one or more preceding segments to the second segment that have previously been delivered to the client 108 were encoded. The extent to which the bit rate calculator 218 uses the bit rate calculated from equation (4) to determine the target bit rate $R_T$ may be application specific. For example, for certain applications a greater importance may be placed on delivering the segment at a competing traffic-friendly rate, in which case the bit rate calculator may place a greater emphasis on the bit rate calculated using equation (4) when calculating the target bit rate. In other applications, a greater emphasis may be placed on achieving a consistent delivery quality at the expense of considering competing traffic over a short to medium time frame. In such a case, the bit rate calculator 218 may place a reduced emphasis on the bit rate calculated according to equation (4) when calculating the target bit rate.

In addition to the above considerations, the bit rate calculator 218 may be arranged to set the target bit rate $R_T$ at a rate greater than or equal to the rate required to deliver the second segment within a specified time interval $\Delta T_2$. As described above, the specified time interval for delivery may be requested by the client 108 or determined by the server 104.

Once the bit rate calculator 218 has calculated the target bit rate, $R_T$, the congestion window unit 212 may calculate the initial size of the second congestion window, $CWND_2$ in accordance with equation (1) rearranged as:

$$CWND_2 = RTT \times R_T \quad (5)$$

At 414, the server 104 delivers the second segment to the client over the network 106 using the second congestion window. The delivery of the second segment is controlled by the dispatch unit 214, which may cause data packets of the second segment to be transmitted over the network via the server's output interface 210. The dispatch unit 214 is further configured to use the initial size of the second congestion window determined at 402 to control the size of the second congestion window for the duration of the second segment delivery (i.e. until the delivery of the second segment has completed).

The dispatch unit 214 may use the initial size of the second congestion window to control the size of the second congestion window throughout the delivery of the second segment in accordance with any of the examples described above with reference to 404 for the delivery of the first segment. For example, the second congestion window may be a constant size throughout the delivery of the second segment and equal to its initial size. Alternatively, the dispatch unit may increase the size of the second congestion window during the delivery of the second segment in periods of no detected packet loss, and may reset the size of the second congestion window to be equal to its initial size following each detected packet loss during delivery of the second segment.

At 416, the packet loss detector 216 measures the packet loss during the delivery of the second segment. The packet loss detector 216 may determine the packet loss for the second segment in the same manner as any of those described above with reference to 406 for the first segment.

Figure 4:
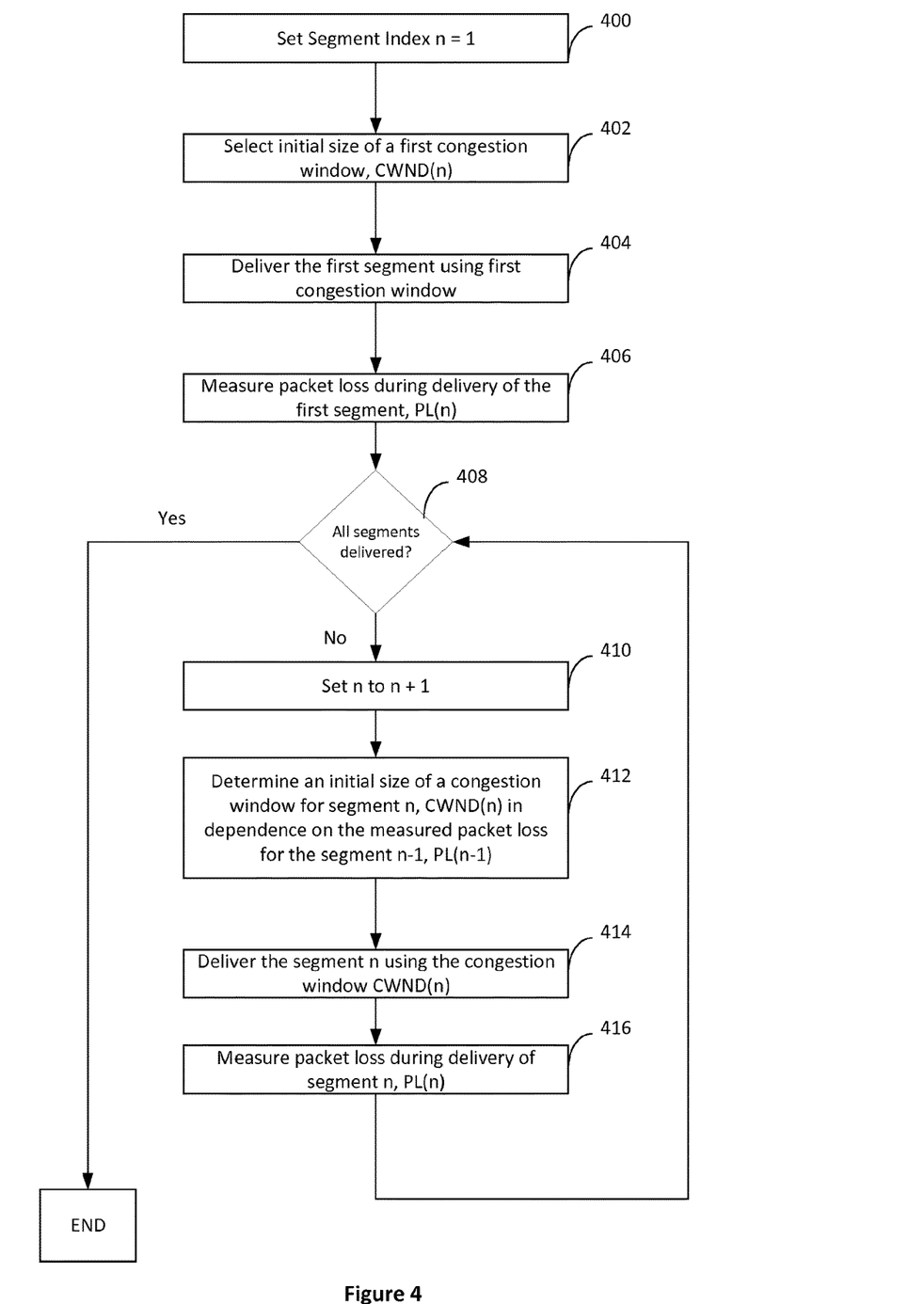
FIG. 4 is a flowchart of a method of delivering media content over a network.

The process of FIG. 4 then returns to 408, and the server 104 determines whether all segments have been delivered for the current streaming session. If it is determined that all segments have been delivered, then the streaming session is deemed completed and the process ends. If it is determined that not all the segments have been delivered, then at 410 the segment index n is again incremented by one, so that n is set to the value of n+1 (continuing the present example, n=3). Then 412 to 416 would be repeated for a third segment to be delivered to the client. In particular, at 412 the congestion window unit 212 determines an initial size of a third congestion window for delivering the third segment in dependence on the measured packet loss during the delivery of the second segment. At 414, the server 104 delivers the third segment using the third congestion window, in which the initial size of the third congestion window is used to control the size of the third congestion window for the duration of the delivery of the third segment. The packet loss detector 216 would measure the packet loss during the delivery of the third segment at 416. The process then returns to 408 and repeats until all segments in the current streaming session have been delivered.

The above examples illustrate how, by controlling the size of a congestion window using its initial size for the duration of a segment delivery, the congestion response to packet loss may be decoupled from the packet loss event itself during the delivery of a segment. This enables the delivery of a segment of data to be completed in a predictable and less variable time. This in turn enables the clients in the communication system to reduce their amount of buffering needed to minimize the risk of content playout stalling, enabling a reduction in end-to-end latency between the initiation of a streaming session and the initiation of content playout at the client.

The examples above have been described in the context of delivering media content over a network using adaptive bit rate delivery and an underlying TCP protocol. However, it will be appreciated that the present disclosure is not limited to adaptive bit rate protocols, but may be implemented in various communication systems in which content is delivered in segments and a form of congestion control for traffic over the network is implemented.

The above examples have been described in the context of a server delivering segments of media content to a client over a network. The server could be an origin server, a content delivery network (CDN) node or a residential gateway device, for example. More generally, the functions of the server described herein may be implemented by a suitably configured transmitter for delivering media content over the network. The clients may be HTTP adaptive bit rate streaming clients. The clients may be adapted to support MPEG DASH, HLS, SmoothStreaming or some other adaptive bit rate streaming protocol. More generally, the clients may be any suitable configured receiver for receiving media content over a network.

The examples above have been described with reference to a 'first segment' and a 'second segment'. The terms 'first' and 'second' have been used as labels for the purposes of clarity and illustration and do not imply either a relative temporal order of the segments within a content stream nor the temporal positions of the segments within the content stream. For example, the 'first segment' need not be the first segment to be delivered in a streaming session but may refer to any non-final segment delivered as part of a content stream. It may refer to a segment being delivered once the underlying TCP protocol has completed a fast start process at the initiation of a streaming session (for example, if the underlying TCP protocol were TCP New Reno or TCP Cubic). The first segment could alternatively refer to a segment delivered during the fast start process, or some other similar process. It will therefore be appreciated from the foregoing that the initial size of the first congestion window as described at 402 may be selected by the congestion window unit 212 in dependence on the measured packet loss for a preceding segment delivered prior to the first segment. That preceding segment may be the segment delivered immediately prior to the first segment or some other preceding segment separated from the first segment in the content stream by one or more intermediary segments.

The server and clients described herein and illustrated in FIGS. 2 and 3 are described and shown as comprising one or more of an input interface and output interface. The terms "input" and "output" are not being used to limit an interface to either solely receiving or transmitting data, but may refer to a direction with which the interface exchanges data with the network. For example, an input interface of the server may be an interface to the content generator; and the output interface of the server may be the interface to the downstream network (e.g. network 106). The input interface of the client (which may be downstream of the server) may be an interface to the upstream network (e.g. network 106). More generally, the input and output interfaces may be referred to as "first" and "second" interfaces. In some implementations, a server and/or client may have a single interface in the form of an input/output interface.

Generally, any of the functions, methods, techniques or components described above for the components of the communication system can be implemented in software, firmware, hardware (e.g., fixed logic circuitry), or any combination thereof. The terms "unit", "detector" and "calculator" as used herein may generally represent software, firmware, hardware, or any combination thereof. In the case of a software implementation, the unit, detector and calculator represent computer program code or computer readable instructions that perform the specified tasks when executed on a processor. The algorithms and methods described herein could be performed by one or more processors executing code that causes the processor(s) to perform the algorithms/methods. The computer program code may be stored on a non-transitory computer-readable storage medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of delivering media content over a network, the media content comprising a plurality of temporal segments, wherein each temporal segment comprises a plurality of data packets, the method comprising:
   selecting an initial size of a first congestion window based on a size of a first temporal segment and a specified time interval for delivering the first temporal segment;
   delivering the plurality of data packets of the first temporal segment using the first congestion window, the initial size of the first congestion window being used to control a size of the first congestion window for a duration of the first temporal segment delivery;
   measuring a packet loss during the delivery of the first temporal segment;
   determining an initial size of a second congestion window in dependence on the measured packet loss for the first temporal segment; and
   delivering a second temporal segment using the second congestion window, the initial size of the second congestion window being used to control a size of the second congestion window for a duration of the second temporal segment delivery.

2. The method as claimed in claim 1, wherein the size of the first congestion window is equal to the initial size of the first congestion window for the duration of the first temporal segment delivery.

3. The method as claimed in claim 1, wherein the size of the first congestion window is variable throughout the delivery of the first temporal segment dependent on the packet loss and controlled so as to be greater than or equal to the initial size of the first congestion window for the duration of the delivery of the first temporal segment.

4. The method as claimed in claim 3, wherein delivering the first temporal segment using the first congestion window comprises increasing the size of the first congestion window from the initial size of the first congestion window during periods of no packet loss, and resetting the size of the first congestion window to the initial size of the first congestion window in response to each packet loss during the delivery of the first temporal segment.

5. The method as claimed in claim 1, wherein the initial size of the first congestion window is selected in accordance with $$CWND_1 \geq \frac{(RTT \times D)}{\Delta T_1},$$

where RTT is a round trip time, D is a data size of the first temporal segment, and $\Delta T_1$ is a specified time interval for delivering the first temporal segment.

6. The method as claimed in claim 1, wherein the initial size of the first congestion window is selected in dependence on a measured packet loss rate for a preceding temporal segment delivered prior to the first temporal segment.

7. The method as claimed in claim 1, the method further comprising calculating a packet loss rate during delivery of the first temporal segment from the measured packet loss; and determining the initial size of the second congestion window in dependence on the calculated packet loss rate for the first temporal segment.

8. The method as claimed in claim 7, wherein the initial size of the second congestion window is determined in dependence on the calculated packet loss rate for only the first temporal segment.

9. The method as claimed in claim 1, wherein the initial size of the second congestion window is determined in dependence on the calculated packet loss rate for the first temporal segment and a calculated packet loss rate for one or more preceding temporal segments delivered prior to the first temporal segment.

10. The method as claimed in claim 9, wherein determining the initial size of the second congestion window comprises determining a target bitrate for the delivery of the second temporal segment in dependence on the calculated packet loss rate for the first temporal segment, and determining the initial size of the second congestion window from the target bitrate.

11. The method as claimed in claim 10, wherein the target bit rate is determined from the calculated packet loss rate for the first temporal segment and the packet loss rates for the one or more preceding temporal segments delivered prior to the first temporal segment.

12. The method as claimed in claim 11, wherein the target bit rate for the delivery of the second temporal segment is determined from an average of the packet loss rates for the first temporal segment and the one or more preceding temporal segments delivered prior to the first temporal segment.

13. The method as claimed in claim 10, wherein the target bitrate for the delivery of the second temporal segment is greater than or equal to the bitrate required to deliver the second temporal segment within a specified time interval $\Delta T_2$.

14. A server for delivering media content over a network, the media content comprising a plurality of temporal segments, wherein each temporal segment comprises a plurality of data packets, the server comprising:
   computing hardware of at least one processor and memory operably coupled to the at least one processor; and
   instructions that, when executed on the computing hardware, cause the computing hardware to implement:

a congestion window unit configured to select an initial size of a first congestion window based on a size of a first temporal segment and a specified time interval for delivering the first temporal segment;

a dispatch unit configured to deliver the plurality of data packets of the first temporal segment using the first congestion window, the dispatch unit being further configured to control a size of the first congestion window using the initial size of the first congestion window for a duration of the first temporal segment delivery; and a packet loss detector configured to measure packet loss during delivery of the first temporal segment;

wherein the congestion window unit is further configured to determine an initial size of a second congestion window in dependence on the measured packet loss for the first temporal segment; and the dispatch unit is further configured to deliver a second temporal segment using the second congestion window, and to control a size of the second congestion window using the initial size of the second congestion window for a duration of the second segment delivery.

* * * * *